US008281385B2

(12) United States Patent  
Callagahan

(10) Patent No.: US 8,281,385 B2  
(45) Date of Patent: Oct. 2, 2012

(54) INTERNET FRIENDLY PROXY SERVER EXTENDING LEGACY SOFTWARE CONNECTIVITY

(75) Inventor: David M. Callagahan, Kirkland, WA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1441 days.

(21) Appl. No.: 11/238,877

(22) Filed: Sep. 29, 2005

(65) Prior Publication Data

US 2007/0074280 A1 Mar. 29, 2007

(51) Int. Cl.  
*H04L 29/06* (2006.01)

(52) U.S. Cl. ......................................................... 726/15

(58) Field of Classification Search .................. None  
See application file for complete search history.

(56) References Cited

U.S. PATENT DOCUMENTS

| | | | |
|---|---|---|---|
| 5,995,624 A * | 11/1999 | Fielder et al. | ................. 713/169 |
| 6,061,603 A | 5/2000 | Papadopoulos | |
| 6,801,920 B1 | 10/2004 | Wischinski | |
| 6,819,960 B1 | 11/2004 | McKelvey | |
| 6,952,727 B1 | 10/2005 | Lindner et al. | |
| 7,047,517 B1 * | 5/2006 | Brown et al. | ................. 717/108 |
| 8,011,000 B2 * | 8/2011 | Barrett | ............................ 726/11 |
| 2001/0025323 A1 | 9/2001 | Sodergren | |
| 2002/0156837 A1 | 10/2002 | Batke | |
| 2002/0156838 A1 | 10/2002 | Batke | |
| 2003/0026393 A1 | 2/2003 | Skladman et al. | |
| 2004/0010627 A1 * | 1/2004 | Ellis et al. | ..................... 709/250 |
| 2004/0133704 A1 | 7/2004 | Krzyzanowski et al. | |
| 2004/0141517 A1 | 7/2004 | Balasubramanian | |

* cited by examiner

*Primary Examiner* — Gilberto Barron, Jr.  
*Assistant Examiner* — Simon Kanaan  
(74) *Attorney, Agent, or Firm* — Turocy & Watson, LLP; R. Scott Speroff; John M. Miller

(57) ABSTRACT

An industrial automation proxy server comprises an interface that receives data related to legacy software, where the data is associated with a legacy protocol. Additionally, the industrial automation proxy server includes a protocol transformation component that converts the data associated with the legacy protocol to a disparate protocol. Furthermore, the industrial automation proxy server can include a routing component that redirects the data to a remote device over an internet connection.

34 Claims, 12 Drawing Sheets

INTERNET FRIENDLY PROXY SERVER EXTENDING LEGACY SOFTWARE CONNECTIVITY

TECHNICAL FIELD

The subject invention relates to industrial control systems and, more particularly, to enabling utilization of legacy software that is incompatible with internet communications with remote devices.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers has been largely unchanged. Industrial controllers are special-purpose computers utilized for controlling industrial processes, manufacturing equipment, and other factory automation processes, such as data collection through networked systems. Controllers often work in concert with other computer systems to form an environment whereby a majority of modern and automated manufacturing operations occur. These operations involve front-end processing of materials such as steel production to more intricate manufacturing processes such as automobile production that involves assembly of previously processed materials. Oftentimes, such as in the case of automobiles, complex assemblies can be manufactured with high technology robotics assisting the industrial control process.

Conventionally, industrial automation environments included a number of local devices that communicated with controller(s) via a local network connection. For example, valves associated with manufacturing equipment located on a factory floor could be wired directly to a local network, and automation could be effectuated with a controller that was located locally on that network. Software developed for use in such industrial automation environments accordingly did not take into account communication within a publicly accessible worldwide system of interconnected computer networks such as the internet.

Advancements in technology have enabled devices within an industrial automation environment to be located at remote locations. For example, a controller can be positioned in a factory while equipment that enables a light at the top of a cell phone tower to blink can be located hundreds of miles away. Communications with remote devices are typically effectuated via an internet connection. Further, these remote devices are often located behind firewalls. However, legacy software designed for use within conventional local networks oftentimes is incompatible for use over the internet. At the time many legacy applications were developed, the protocols employed failed to contemplate use over the internet. Accordingly, such legacy software needs to be modified to support web services and/or firewall friendly protocols to communicate with remote devices. However, altering legacy software is a time intensive task for developers of the software. Additionally, requiring modification of legacy applications to enable communications over the internet is costly for customers who currently utilize software that fails to support internet communications, since these customers will have to purchase and install updated software.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter described herein relates to enabling current and/or legacy software to be utilized in connection with devices located at remote locations in an industrial automation environment. An industrial automation device such as, for example, a controller can employ legacy software that is incompatible with communications over an internet connection and/or through a firewall. However, it can be desired to utilize this legacy software with devices located at remote locations. Accordingly, a proxy server can be utilized with the legacy software to enable communications without requiring a new version of the software to be developed. The proxy server can support transforming a protocol associated with the legacy software into a disparate protocol that is suitable for web based communications and/or tunneling through firewalls. Additionally or alternatively, the proxy server can enable the communication to be properly routed to the remote device. For example, the proxy server can route a communication directed towards a non-routed port and/or a local IP address to a port that supports internet communications and/or a remote IP address. Pursuant to another example, a one to one relationship can be created between a particular device employing legacy software and a remote device such that any communications related to the legacy software yielded by the device can be redirected to an IP address associated with the remote device.

According to an aspect, data can be converted to a protocol associated with web based communications and/or tunneling through a firewall located between a device utilizing legacy software, which is unsuited for such communications, and a remote device. Once converted to the disparate protocol, the data can be transferred to a remote device. The remote device can receive the transferred data and can directly utilize the data while in the disparate protocol. Alternatively, the remote device can unpackage the data (e.g., remove it from an encapsulating protocol) and thereafter utilize the transmitted data.

Pursuant to another illustration, the remote device can convert the data to the original protocol associated with the legacy software and thereafter employ the data. The appended claims, however, are not limited to the remote device directly utilizing the received data; instead, it is contemplated that a proxy server can be employed to receive data that is transmitted over the internet for the remote device. Subsequent to the remote proxy server receiving and converting the protocol, the data can be transmitted to and employed by the remote device.

Moreover, an encryption mechanism can be employed with various aspects of the claimed subject matter described herein. For instance, encryption can be utilized to prevent tampering with data that is transmitted over the internet. Any suitable encryption and/or decryption technique can accordingly be employed. Furthermore, the proxy server, according to an aspect, can support multiple client applications simultaneously. Additionally, communications to the remote device can be throttled with the proxy server.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
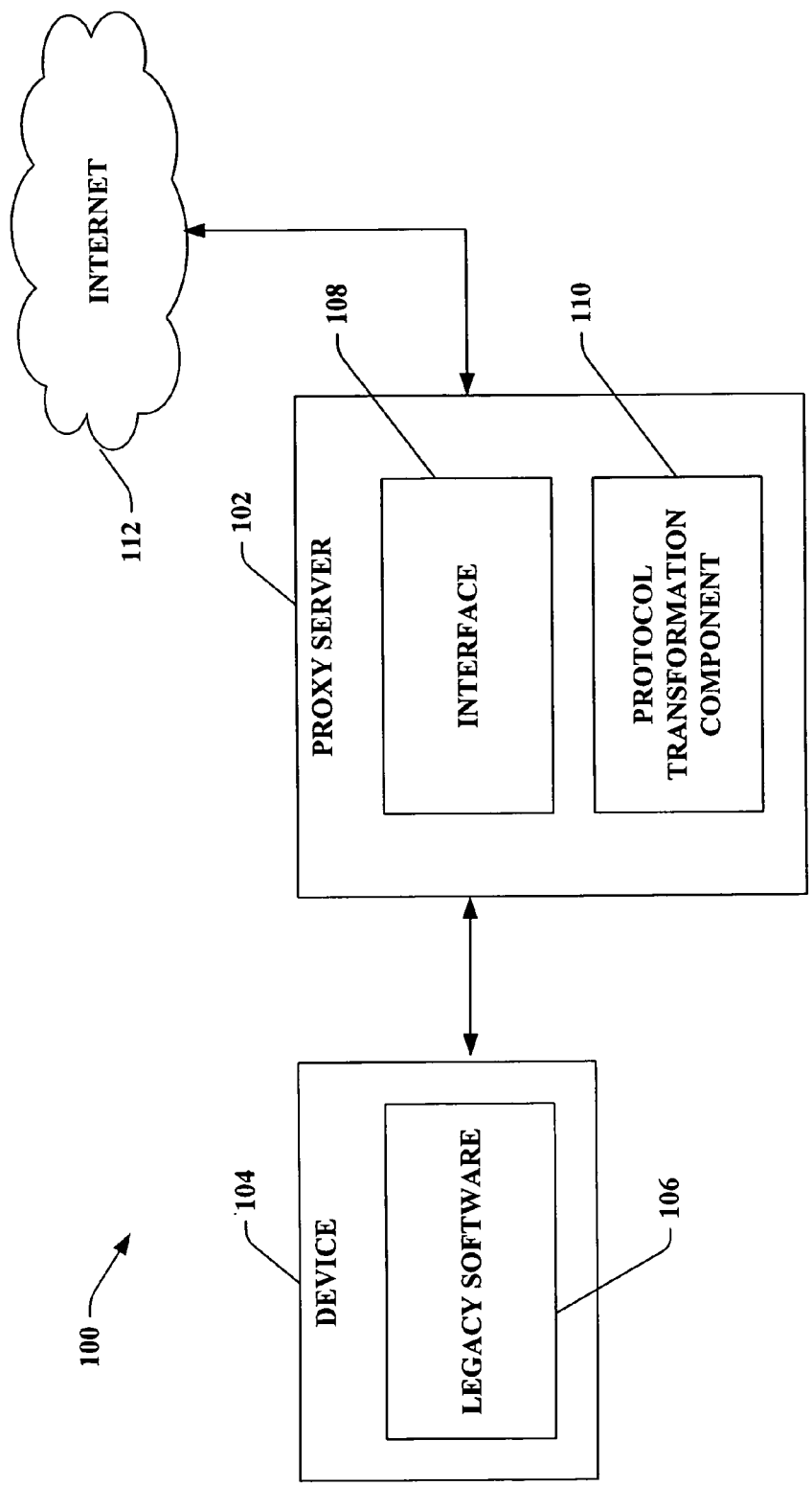
FIG. 1 illustrates a system that enables current and/or legacy software to be utilized in connection with devices located at remote locations in an industrial automation environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that enables current and/or legacy software to be utilized in connection with devices located at remote locations in an industrial automation environment. The system 100 includes a proxy server 102 that receives data from and transmits data to a device 104 (e.g., industrial automation device) that utilizes legacy software 106 which can be incompatible with use over the internet 112 and/or communication with a remote device located behind a firewall. The device 104 can be, for example, a programmable logic controller (PLC), a numeric controller, a robotic controller, a smart device, a factory device (e.g., sensor, motor starter, solenoid, pilot light, speed drive, valve, . . . ), a personal computer, or any other type of device that can employ legacy software 106. Additionally, although not depicted, the device 104 can utilize software that employs a web based protocol. It is contemplated that the legacy software 106 can be any application that is utilized in connection with an industrial automation environment that includes a local network of devices. Also, the legacy software 106 employs a protocol that can be incompatible with transmission over the internet 112 and/or a firewall (e.g., legacy protocol).

The proxy server 102 can communicate with the device 104 that utilizes the legacy software 106. In particular, the proxy server 102 includes an interface 108 that can facilitate receiving and/or transmitting data associated with the legacy software 106. Additionally, although not depicted, the interface 108 can be employed to transmit and/or receive data from a remote device via an internet connection. The interface 108 can be software, hardware, firmware, or a combination thereof.

The proxy server 102 can receive data from the device 104 and/or a remote device via the interface 108. The proxy server 102 further can include a protocol transformation component 110 that facilitates converting a protocol associated with the data received by the interface 108 into a disparate protocol. Pursuant to an example, data with a corresponding protocol that is incompatible with internet communications can be obtained by the interface 108. Thereafter, the protocol transformation component 110 can alter the protocol of the received data into a protocol that can be utilized to transfer the data over the internet 112 to a device located at a remote location. The interface 108 can then be utilized to facilitate the transfer of the transformed data via an internet connection. Additionally, the protocol transformation component 110 can receive data formatted according to an internet based protocol and translate it into a disparate protocol that can be utilized by the legacy software 106 that is executed upon the device 104.

The protocol transformation component 110 can convert data from any first protocol to any second protocol. The protocols utilized in connection with transmission of data over the internet 112 can be, for instance, Transmission Control Protocol/Internet Protocol (TCP/IP), User Datagram Protocol (UDP), HyperText Transfer Protocol (HTTP), HTTPS, Internet Protocol version 6 (IPv6), Elliptic Curve Cryptography (ECC), Elliptical, RSA, Advanced Encryption Standard (AES), Simple Object Access Protocol (SOAP), web services, etc. Further, any protocol utilized with the legacy software 106 that fails to support remote communications via the internet 112 and/or transmission of data with a device behind a firewall can be employed in accordance with an aspect (e.g., common industrial protocol (CIP), . . . ).

The proxy server 102 differs from conventional proxy servers. Conventional proxy servers allow clients to make indirect network connections to other network services. A client can connect to the conventional proxy server and request a connection, file, etc. from a disparate server and the conventional proxy server can enable a connection to the disparate server or provide the content from a cache. Thus, the conventional proxy server receives a message in a web protocol such as, for example, HyperText Transfer Protocol (HTTP), and transfers the message to a client in the same web protocol. On the contrary, the subject proxy server 102 can employ the protocol transformation component 110, which can be utilized to convert data in a first protocol into data in a second protocol.

Another advantage associated with use of the proxy server 102 is that it can enable seamless integration with the legacy software 106. More particularly, changes need not be made to the legacy software 106 that is incompatible with internet communications; thus, the legacy software 106 and/or device 104 continue to operate as if the communications are occurring locally in accordance with the original design of the legacy software 106. Instead, the proxy server 102 can utilize the data provided by the device 104 employing the legacy software 106 and can convert it into an appropriate format which can be communicated to a remote device over the internet 112 and/or traversed through a firewall.

Although the proxy server 102 is depicted as being separate from the device 104, it is contemplated that the proxy server 102 can be a shim layer that is installed upon the device 104. Accordingly, the legacy software 106 can provide an output that is intercepted by the proxy server 102 and the protocol transformation component 110 can modify the format of the output to meet the requirements of a desired second protocol. Thereafter, the transformed output that can be utilized in connection with internet communications and/or tunneling through a firewall in order to be employed with a remote device. The proxy server 102 can be software, hardware, or a combination thereof. Additionally, the proxy server 102 can be installed on a disparate device on the same local network as the device 104 (e.g., a server, . . . ). Pursuant to a further example, the proxy server 102 can execute on infrastructure components associated with the local network upon which the device 104 is located and/or the internet 112. Thus, the proxy server 102 can be a network based application that is hosted upon one or more network infrastructure components (e.g., gateway, router, bridge, switch, Ethernet hub, repeater, firewall, multiplexer, modem, . . . ).

Figure 2:
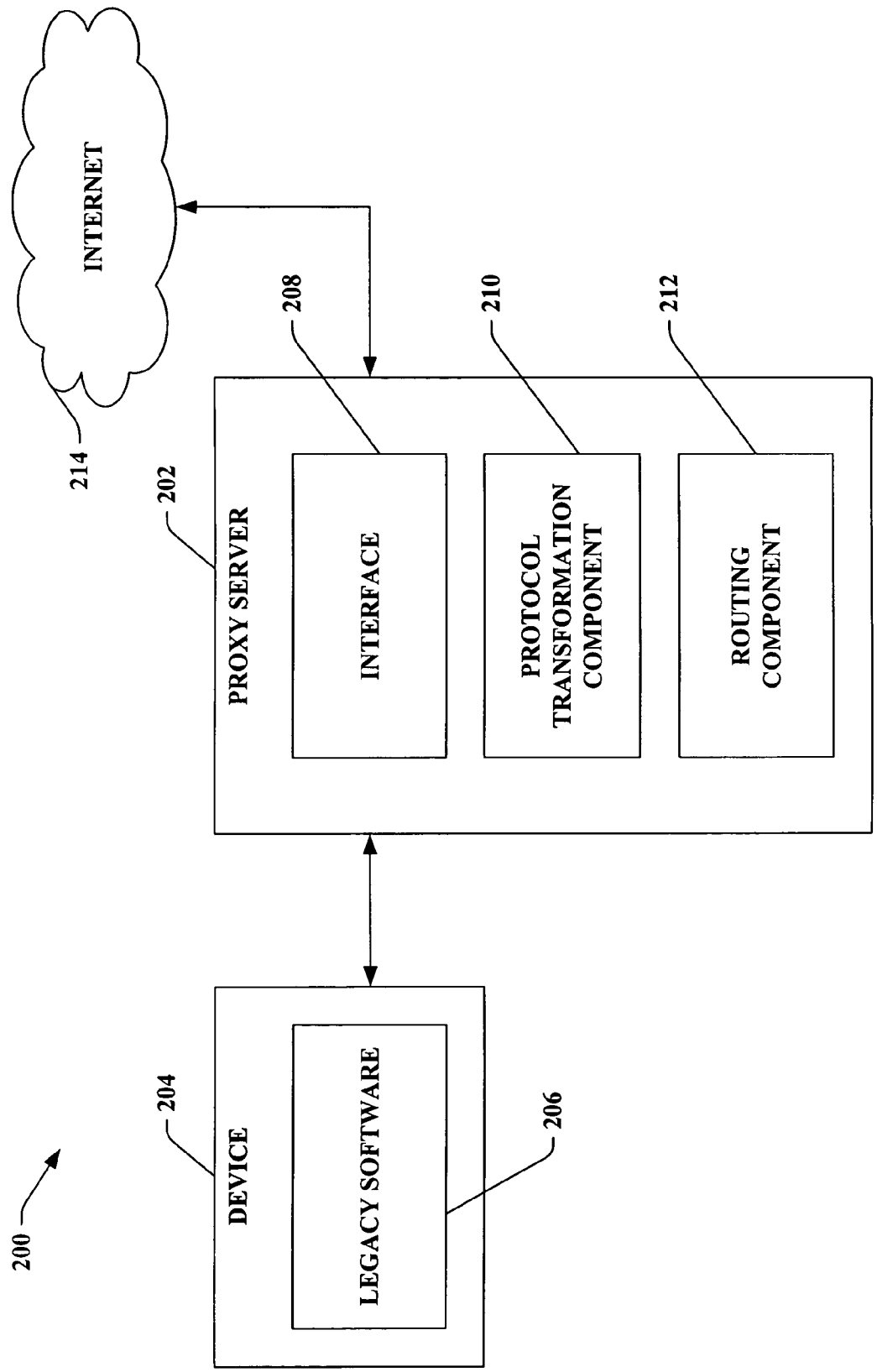
FIG. 2 illustrates a system that facilitates transforming and/or routing data associated with legacy software to a remote device in an industrial automation environment.

With reference to FIG. 2, illustrated is a system 200 that facilitates transforming and/or routing data associated with legacy software to a remote device in an industrial automation environment. The system 200 includes a proxy server 202 that obtains data formatted according to a protocol that can be incompatible with a transfer over the internet 214 from a device 204, which is utilizing legacy software 206. The proxy server 202 includes an interface 208 that receives data from and/or transmits data to the device 204 in a protocol that complies with the requirements of the legacy software 206. Additionally, the interface 208 can facilitate receiving and/or transmitting data to a remote device (not shown) via communications over the internet 214. Further, the proxy server 202 includes a protocol transformation component 210 that transforms data received by the interface 208 into a disparate protocol.

The proxy server 202 also includes a routing component 212 that directs an output from the device 204 employing the legacy software 206 to a remote location. By way of illustration, the legacy software 206 can be utilized in connection with a device (not shown) located at a remote location via utilizing the routing component 212. Communications between the device 204 and the remote device can be transmitted over the internet 214. For example, an enterprise can utilize legacy software 206 with a personal computer to monitor the status of a blinking light upon a cell phone tower located a few hundred miles away. The legacy software 206, however, can attempt to communicate with the remote device utilizing a local IP address and/or a non-routable port upon which an internet service provider will not forward data. The routing component 212 intercepts the transfer to the local IP address and/or non-routable port and redirects the communication to a disparate IP address and/or port associated with the remote device. Thus, data provided by the legacy software 206 can be converted to an appropriate protocol for web transmission by the protocol transformation component 210 and can be redirected to an IP address and/or port related to the remote device by the routing component 212.

The routing component 212 can intercept data directed to a non-routable port. For example, legacy software 206 can attempt to communicate over port 44818; however, an internet service provider may not forward packets across the internet to that port. Accordingly, the routing component 212 can instead direct the communications to a disparate port such as port 80, which can be associated with a web server; the appended claims, however, are not limited to use of such ports and instead contemplate communicating over the internet utilizing any suitable port and employing any non-routed port with the legacy software 206.

Further, the legacy software 206 can yield an output that is intended to be utilized in connection with a remote device, but an IP address associated with the output can be a local IP address. The legacy software 206, for instance, can direct the communications to an internal, non-routed private address such as an IP address within the following ranges: 10.0.0.0 to 10.255.255.255, 172.16.0.0 to 17.31.255.255, and 192.168.0.0 to 192.168.255.255. The subject innovation, however, is not limited to the legacy software 206 directing an output to such IP addresses. The routing component 212 can intercept the output yielded via the legacy software 206 and modify the destination by providing a different IP address associated with the remote device. Thereafter, the interface 208 can facilitate transferring the output with the modified IP address to the remote device via an internet connection.

The proxy server 202 can enable tunneling of a legacy protocol associated with legacy software 206 across the internet to a remote device and/or through a firewall which can be in front of the remote device. Additionally, the proxy server 202 can support multiple client applications at the same time. Further, the proxy server 202 can be utilized to throttle communications to the remote device. The routing component 212 can control the flow of data to a remote device, for instance.

Figure 3:
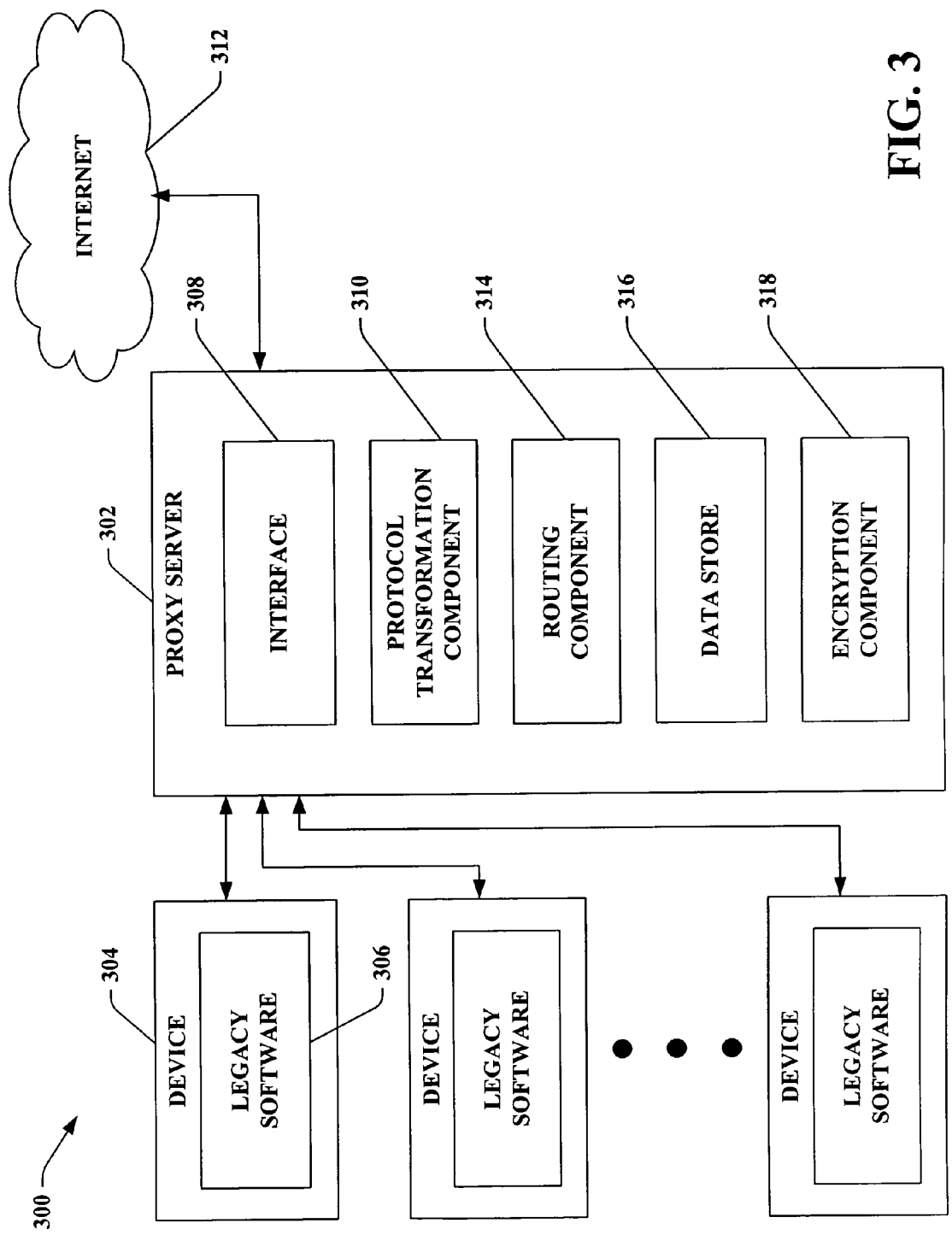
FIG. 3 illustrates a system that enables transferring data over an internet connection in an industrial automation environment with local devices utilizing legacy software that is incompatible with such types of communications.

Turning to FIG. 3, illustrated is a system 300 that enables transferring data over an internet connection in an industrial automation environment with local devices utilizing legacy software that is incompatible with such types of communications. The system 300 includes a proxy server 302 that is coupled to N devices 304 that employ legacy software 306, where N is any positive integer. The devices 304 can be similar types of devices (e.g., all can be PLCs, . . . ) or disparate types of devices (e.g., a PLC, a personal computer, a PDA, a smart device, . . . ). Additionally, the same and/or disparate legacy software 306 can be utilized with each of the devices 304. The proxy server 302 utilizes an interface 308 to obtain data generated with the legacy software 306 associated with each of the devices 304 and/or provide data to the devices 306 for use with the legacy software 306. The data transferred between the proxy server 302 and the devices 304 can be associated with a protocol that is employed by the legacy software 306. This protocol can be incompatible with being transferred between devices over an internet connection. Additionally or alternatively, the protocol can be unsuited for tunneling through a firewall situated between two devices. It is also contemplated that the devices 304 can additionally employ software that utilizes protocol(s) that are compatible with use over an internet connection and/or in conjunction with a firewall.

The proxy server 302 further includes a protocol transformation component 310 that converts data from a first protocol in which it is formatted when received from one of the devices 304 utilizing the legacy software 306 into a desired second protocol for transfer over the internet 312 to a remote device (not shown). The protocol transformation component 310 can modify any first protocol into any second protocol. Further, the protocol transformation component 310 can convert the protocols associated with each of the devices 304 into the same protocol or any number of disparate protocols for transfer over the internet 312. By way of example, two devices 304 can provide data in a protocol associated with the legacy software 306. The protocol transformation component 310 can convert the data from both devices 304 to conform with the TCP/IP protocol. Alternatively, the protocol transformation component 310 can modify the data from one of the devices 304 to comply with the TCP/IP protocol and the data from the other device 304 to comply with the UDP protocol. The appended claims, however, are not limited to these examples.

Additionally, the proxy server 302 includes a routing component 314. The routing component 314 maps a client connection of the legacy software 306 to a remote device. The routing component 314 can utilize information from a data store 316 to direct a client connection to a proper location. By way of illustration, the data store 316 can include a lookup table that provides a remote IP address that corresponds with an internal, non-routed private address for a particular remote device. Thus, the routing component 314 can receive data directed to an internal, non-routed private address (e.g., 10.10.10.10) and an associated remote IP address can be retrieved from the data store 316. Accordingly, the data is then transferred over the internet 312 to the remote IP address. Pursuant to another example, a one to one mapping can be created between a particular device 304 utilizing legacy software 306 and a remote device. Thus, the routing component 314 can determine the identity of a particular device 304 that is attempting to communicate with a remote device, and an IP address and/or port associated with that device 304 can be obtained from the data store 316. Thereafter, the communication can be directed to the retrieved IP address and/or port. In accordance with a further illustration, the routing component 314 can determine that data is directed to a non-routable port and a remote IP address associated with that non-routable port and/or the particular device 304 providing the data can be retrieved from the data store 316; thus, the routing component 314 can enable a connection between the particular device 304 and a remote device. The routing component 314 also can receive data from a remote device via the internet 312 and direct the communication to a proper one of the devices 304. Moreover, users, administrators and/or software agents can configure the routing information in the data store 316 by logging into the system and/or providing this information via a secure mechanism.

The proxy server 302 can additionally enable configuring the remote device. For example, configuration information that can be utilized by the remote device to enable communications with a particular one of the devices 304 can be included along with a payload of the data transmitted via the internet 312 to the remote device. The configuration information, for instance, can be provided by the data store 316, a user, an administrator, a device 304, etc. The configuration information can be specific to a particular remote device. Further, the configuration information can facilitate configuring an operational remote device. Pursuant to an illustration, it is contemplated that the initial communication with a particular remote device can include the configuration information, while subsequent communications may not include such data; however, the claimed subject matter is not so limited.

The proxy server 302 also comprises an encryption component 318 that encrypts and/or decrypts communications that are transmitted via the internet 312. Any suitable encryption technique can be employed in connection with the encryption component 318. For example, the encryption component 318 can utilize private key encryption, public key encryption, symmetric key encryption, ECC, DES, SHA-1, RSA, AES, etc. Additionally, the encryption component 318 can employ a message authentication code or digital signatures. According to another example, the encryption component 318 can wrap the data from the legacy software 306 into a type 1 communication to enable a highly secure transmission. Pursuant to a further example, the encryption component 318 can encapsulate a packet of data obtained from the legacy software 306 to tunnel across the internet 312 by utilizing a protocol such as GRE, IPSec, L2F, PPTP, L2TP, etc., which is wrapped around the original data. The encryption component 318 facilitates creating a secured layer between the device 304 and the remote device, which enables the legacy software 306 to tunnel across the internet 312 through a firewall without having to modify the software itself. Upon receipt of encrypted data by the proxy server 302, the encryption component 318 decrypts the data and provides it to the appropriate device 304.

Figure 4:
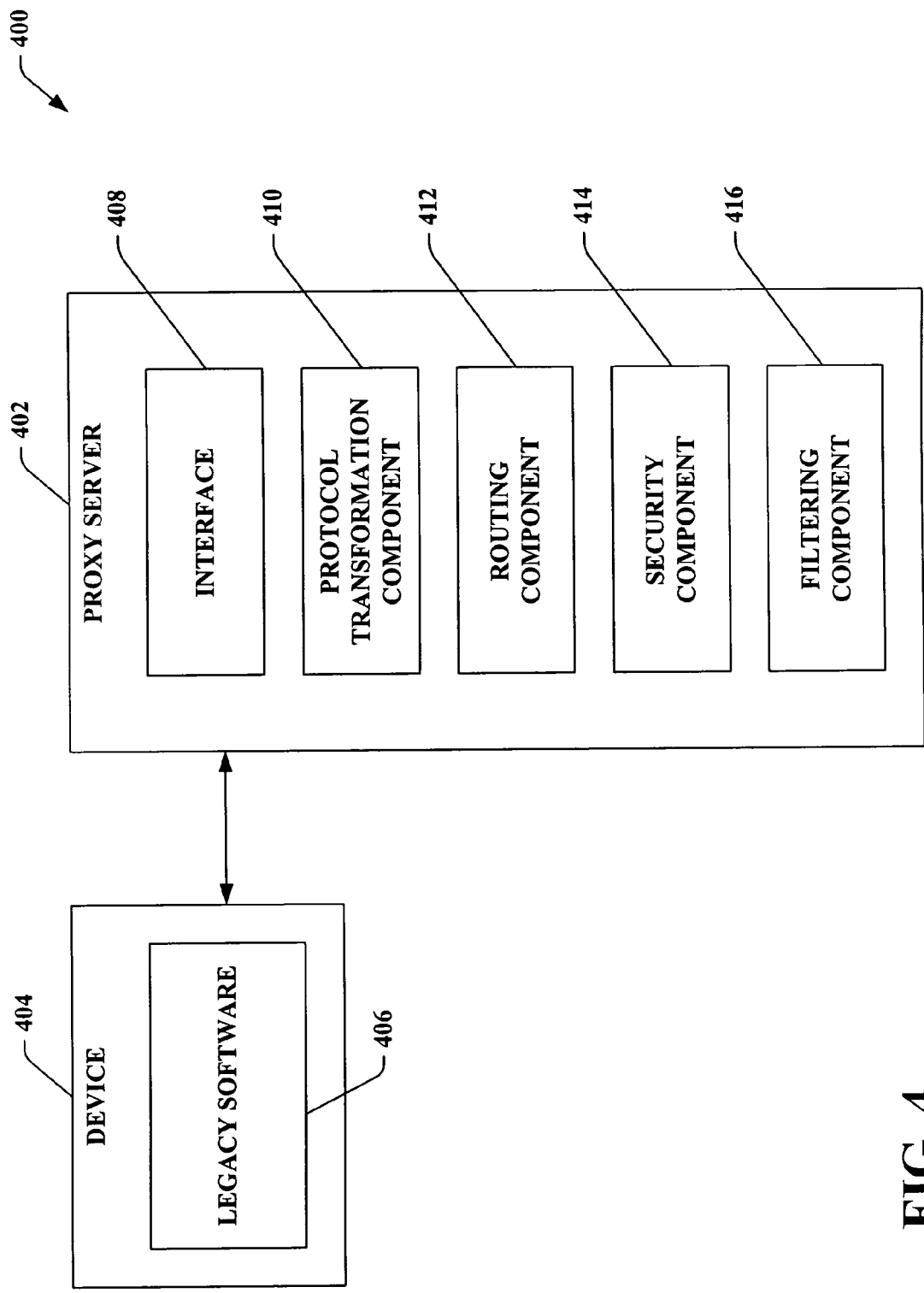
FIG. 4 illustrates a system that enables utilizing a legacy application that is incompatible with web services with a remote device in an industrial automation environment.

Now turning to FIG. 4, illustrated is a system 400 that enables utilizing a legacy application that is incompatible with web services with a remote device in an industrial automation environment. The system 400 includes a proxy server 402 that is communicatively coupled with a device 404 that employs legacy software 406. The proxy server 402 receives and/or transmits data associated with the legacy software 406 via an interface 408. Additionally, the legacy software 406 can provide data formatted according to a protocol that is unsuited for internet communications, and accordingly, a protocol transformation component 410 translates the data into a protocol that is appropriate for communicating with a remote device (not shown). Further, a routing component 412 ensures that communications from the device 404 are properly directed to a desired remote device.

The proxy server 402 can further include a security component 414 that is employed to ensure that unauthorized users/entities and/or users/entities without requisite permissions are unable to access and/or alter data from the device 404 generated via the legacy software 406. For example, the security component 414 can include or access usernames, passwords, personal identification numbers (PINs), or other data that can identify a user, a device, an object, or the like. Furthermore, the security component 414 can interface with smart cards or receive biometric indicia, such as a voice sample, a fingerprint, a retinal scan, or the like, and determine an identity of a user as well as access privileges associated with such user. While shown as being internal to the proxy server 402, it is to be understood that the security component 414 can exist in any suitable device that is communicatively coupled to the proxy server 402 and/or the device 404, or the security component 414 can be included within the device 404. For example, the security component 414 can exist within a server that provides security services to a plurality of industrial automation devices (not shown).

The security component 414 can also operate in conjunction with a filtering component 416 which can filter data based on user identity, user location, remote device location, or any other suitable parameter. For instance, an operator can utilize the device 404 with the legacy software 404 to obtain data from a remote device by way of the proxy server 402. The filtering component 416 can filter retrieved data so that only data pertinent to an operator's identity and/or current task is returned to the operator. Additionally, the filtering component 416 can filter data received by the proxy server 402 so that only data associated with a particular version of the legacy software 406 is returned.

Figure 5:
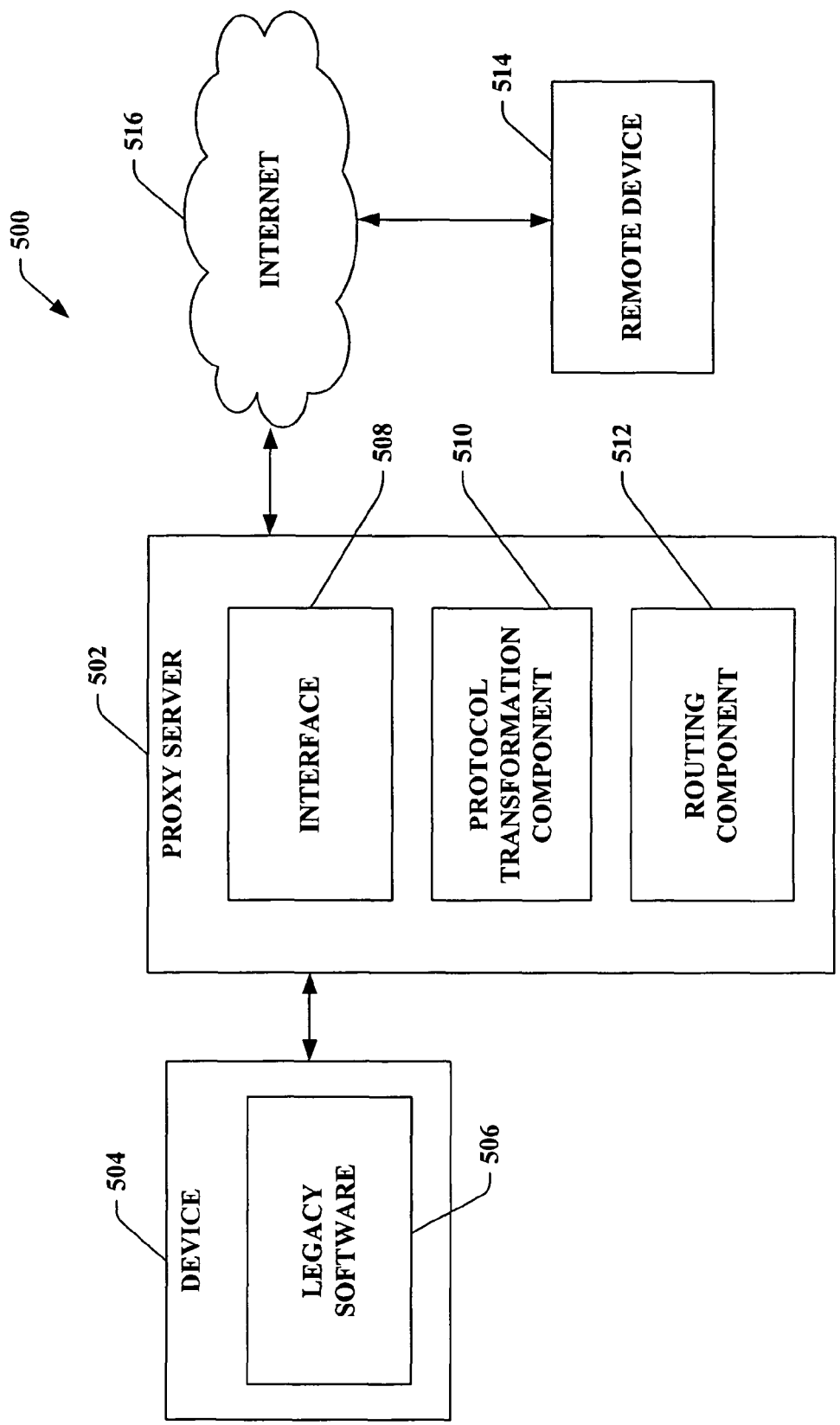
FIG. 5 illustrates a system that enables legacy software to connect to remote devices in an industrial automation environment.

Turning to FIG. 5, a system 500 that enables legacy software to connect to remote devices in an industrial automation environment is illustrated. The system 500 includes a proxy server 502 that is coupled to a device 504 that utilizes legacy software 506. The legacy software 506 fails to support web based communications and/or traversing a firewall. The proxy server 502 includes an interface 508, a protocol transformation component 510, and a routing component 512. The interface 508 enables the proxy server 502 to receive data from and/or transmit data to the device 504 and/or a remote device 514 via the internet 516.

The interface 508 can utilize any type of internet access to communicate with the remote device 514 via the internet 516. For example, the interface 508 can utilize connections such as dial-up, broadband (e.g., coaxial cable, fiber optic, copper wire, . . . ), Wi-Fi, WiMax, satellite, cell phone, etc. to connect to the internet 516. Additionally, the remote device 514 can utilize a similar type of connection to the internet 516. By way of illustration, the proxy server 502 can wirelessly connect to the internet 516 via the WiMax standard, IEEE 802.16, which enables high-speed connectivity in a radius up to 50 km; however, the subject innovation is not limited to such a connection.

The remote device 514 can be any device that can be employed within the industrial automation environment. The remote device 514 can be, for instance, a sensor, a motor starter, a solenoid, a pilot light, a display, a speed drive, a valve, etc. Additionally, the remote device 514 can be a PLC, a numeric controller, a robotic controller, a smart device, a personal computer, or any other type of device utilized in the industrial automation environment. Further, the remote device 514 can be behind a firewall (not shown). The firewall can be hardware, software, or a combination thereof. Also, the firewall can be installed upon the remote device 514 or a stand alone component.

According to an example, the remote device 514 can be a control system associated with a light that blinks at the top of a cell phone tower. The control system can connect directly to the internet 516 via an Ethernet cable. Legacy software 506 can be employed by the device 504 to monitor the light, which can be located hundreds of miles away from the device 504. The proxy server 502 can receive data associated with the legacy software 506 in a first protocol (e.g., CIP, . . . ) and convert it to a web based protocol (e.g., TCP/IP, UDP, . . . ) with the protocol transformation component 510. Additionally, the routing component 512 can map the legacy software 506 client connection to the remote device 514. The remote device 514 can support the data communicated over the internet 516 in the web based protocol. For example, the remote device 514 can decrypt the data transmitted by the proxy server 502 and apply it; thus, security is enhanced since the data is not decrypted and then further transmitted to another device, where this further communication of unencrypted data could be obtained and/or altered by an unauthorized individual who patches into this additional connection which is located at a remote location.

Figure 6:
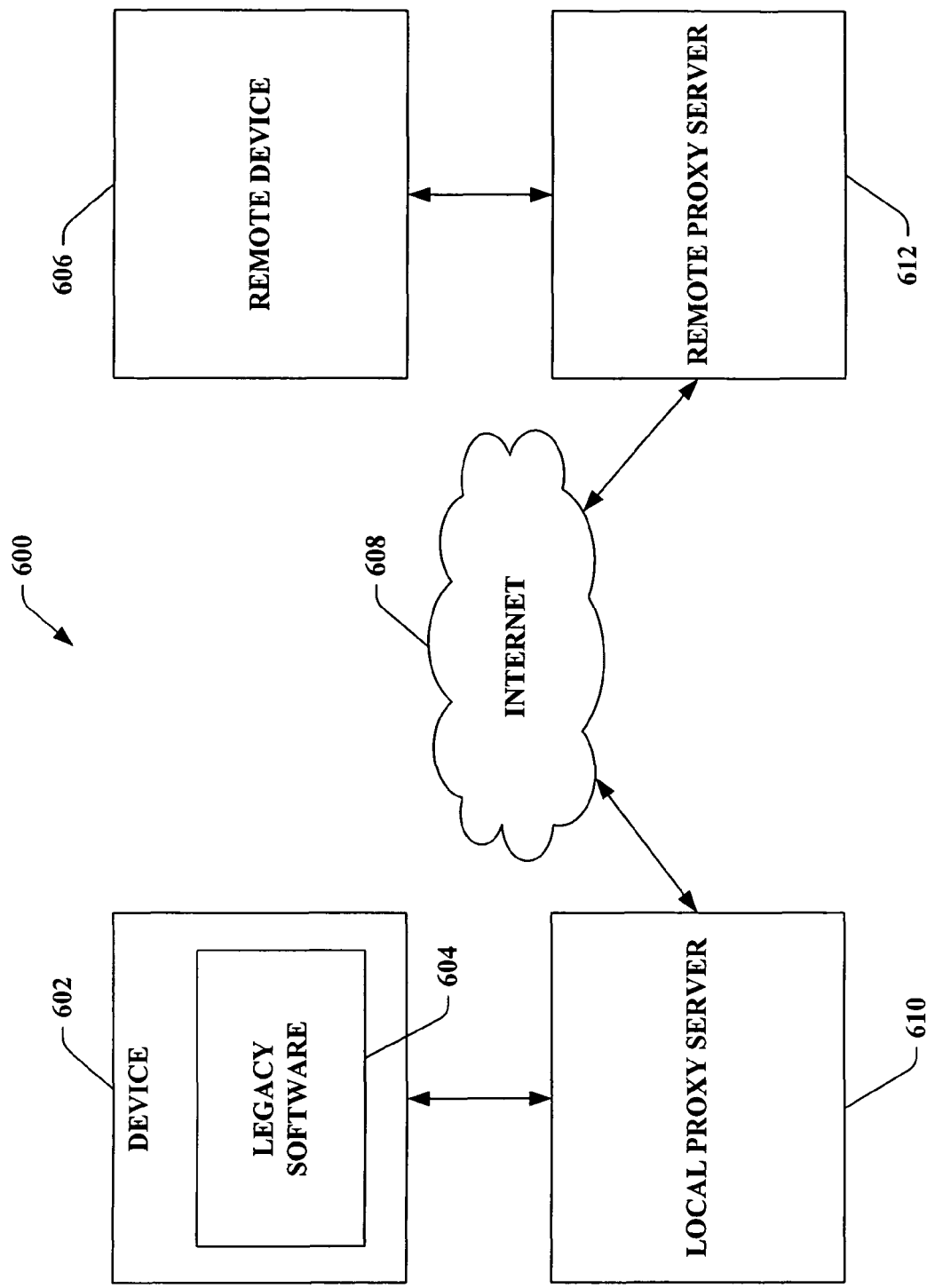
FIG. 6 illustrates a system that enables utilizing a legacy application with a device located at a remote location in an industrial automation environment.

Turning to FIG. 6, illustrated is a system 600 that enables utilizing a legacy application with a device located at a remote location in an industrial automation environment. The system 600 includes a device 602 that utilizes legacy software 604. The device 602 connects to a remote device 606 via the internet 610 by employing a local proxy server 610. The local proxy server 610 converts the data from the legacy software 604 that is associated with a particular protocol to a disparate protocol that supports communication over the internet 608. Further, the system 600 includes a remote proxy server 612 that communicates with the local proxy server 610 and converts data between two disparate protocols in a manner similar to the local proxy server 610. It is to be noted that local proxy server 610 and remote proxy server 612 are substantially similar. The local proxy server 610 and the remote proxy server 612 can re-route communications to and from the device 602 and remote device 606, respectively (e.g., utilizing a routing component (not shown)). Additionally, according to an aspect, at least one of the local proxy server 610 and the remote proxy server 612 can be incorporated into the device 604 and remote device 606, respectively.

Figure 7:
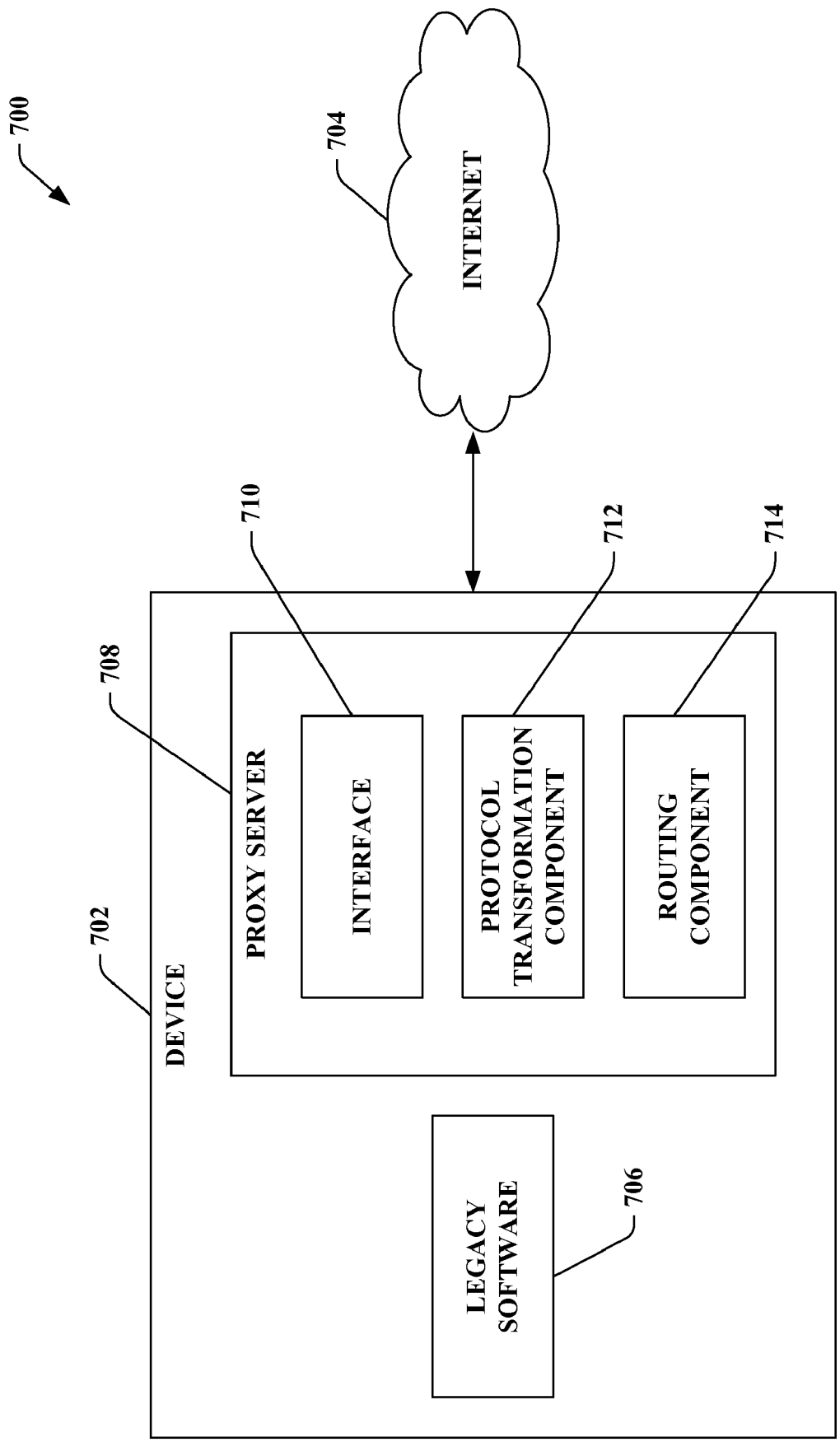
FIG. 7 illustrates a system that enables legacy applications that are incompatible with web based communications to connect to remote devices via tunneling legacy protocols over an internet connection in an industrial automation environment.

With reference to FIG. 7, illustrated is a system 700 that enables legacy applications that are incompatible with web based communications to connect to remote devices via tunneling legacy protocols over an internet connection in an industrial automation environment. The system 700 includes a device 702 that communicates with a remote device (not shown) over the internet 704. The device 702 utilizes legacy software 706, which has associated legacy protocols. The device 702 further includes a proxy server 708 that intercepts the data provided by the legacy software 706. The legacy software 706 operates without modification and provides communications according to its original protocols. The proxy server 708 intercepts data associated with the legacy software 706 with the interface 710, converts the data to a protocol that can support communicating over the internet 704, and varies an IP address and/or port to which the communication is directed via utilizing the routing component 714. The proxy server 708 can additionally receive data in an web based protocol and translate and/or unwrap the data into a protocol that conforms with the legacy software 706. It is to be appreciated that the proxy server 708 can be a shim layer that is utilized by the device 702 in connection with the legacy software 706.

Figure 8:
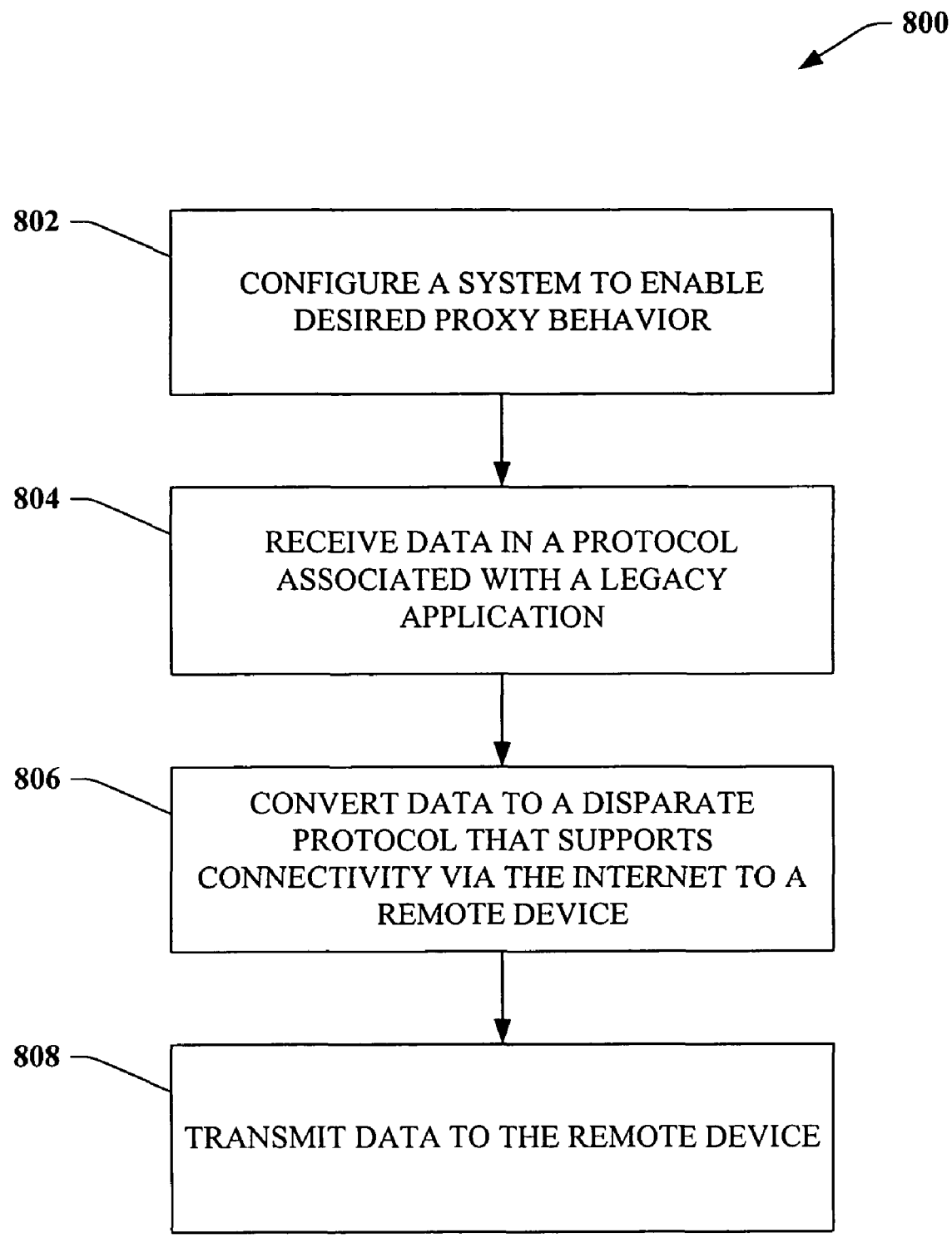
FIG. 8 is a representative flow diagram of a methodology for utilizing legacy software with devices located remotely in an industrial automation environment.
Figure 9:
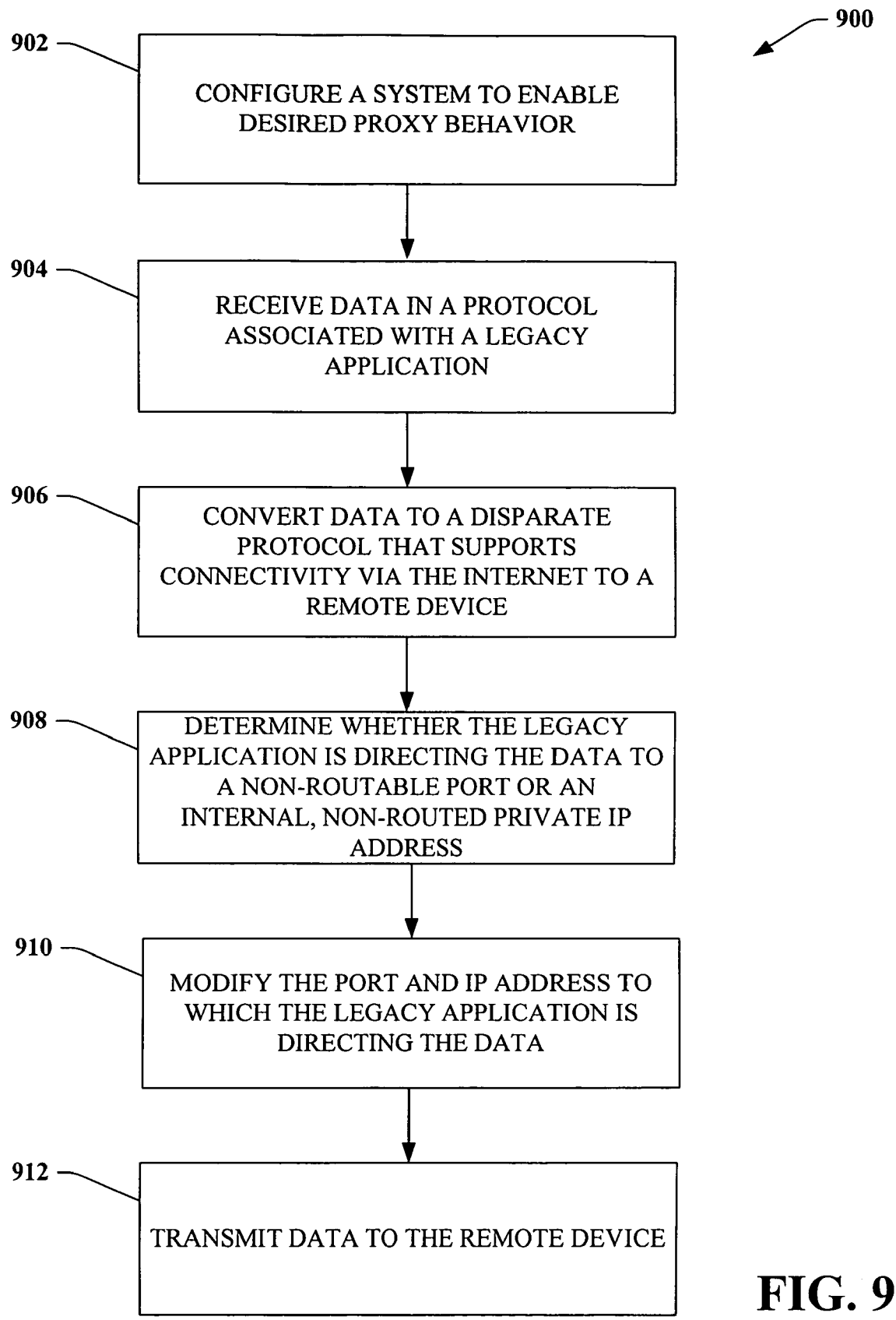
FIG. 9 is a representative flow diagram of a methodology for altering and/or routing data from a legacy application to a remote device in an industrial automation environment.
Figure 10:
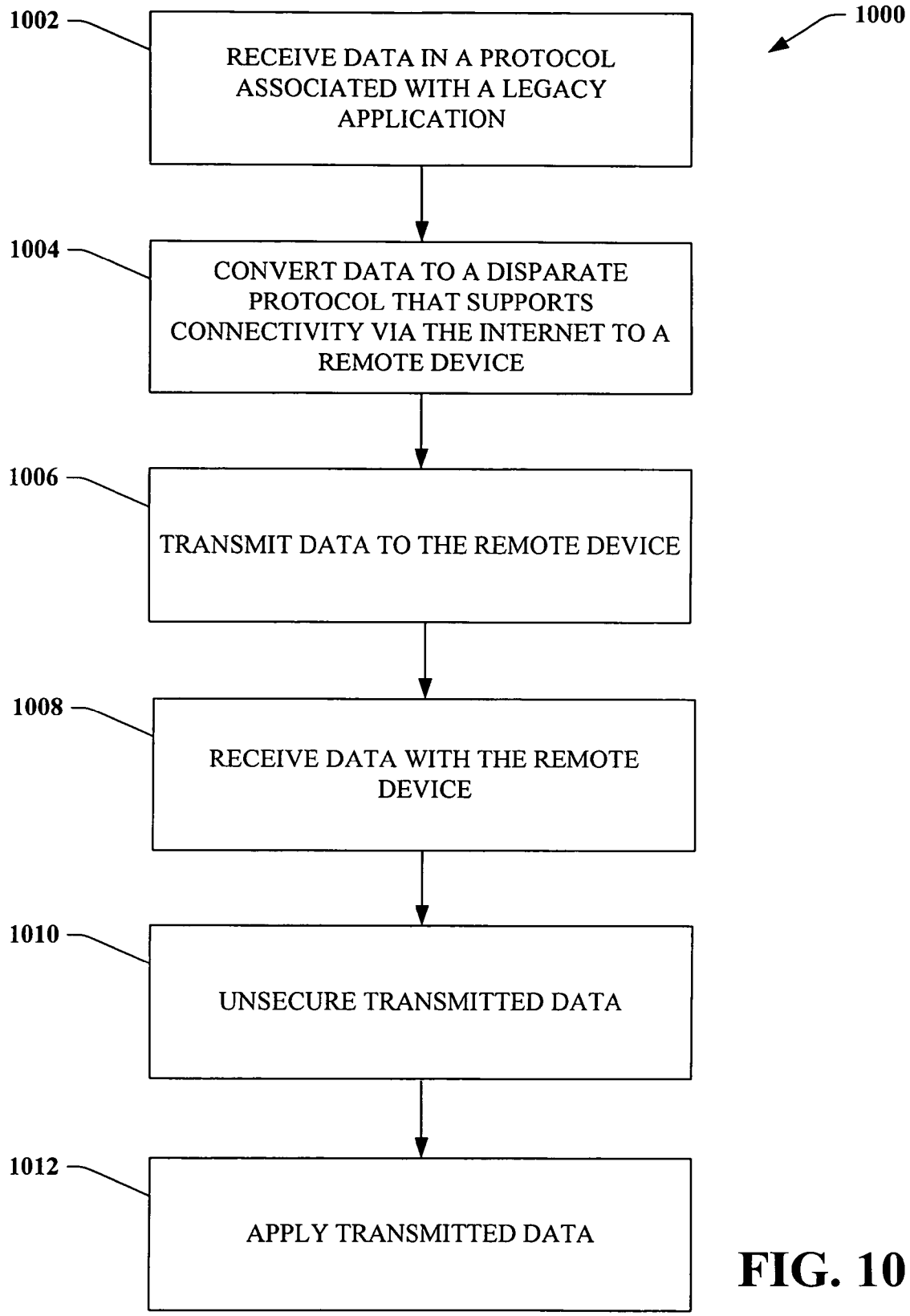
FIG. 10 is a representative flow diagram of a methodology that enables secure communication over an internet connection and/or through a firewall between a legacy application and a remote device in an industrial automation environment.

Referring to FIGS. 8-10, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning to FIG. 8, illustrated is a methodology 800 for utilizing legacy software with devices located remotely in an industrial automation environment. At 802, a system can be configured for desired proxy behavior. For instance, configuration can be effectuated a first time that a device is utilized with a legacy application for communication with a particular remote device, while the configuration can be omitted in connection with subsequent communications. At 804, data that has an associated protocol that corresponds to a legacy application is received. For example, the data associated with the legacy application can utilize a CIP protocol; however, the subject innovation is not so limited. The legacy application utilizes a protocol that is incompatible with web communications and/or tunneling through a firewall. The data can be received by intercepting an output from the legacy application. Accordingly, alterations to the legacy application need not be made to enable communication with the remote device. At 806, the received data is converted into a disparate protocol that supports connectivity via the internet to the remote device. The data can be converted into any disparate protocol. For example, TCP/IP, UDP, HTTP, HTTPS, IPv6, ECC, Elliptical, RSA, AES, SOAP, web services, etc. can be utilized. According to an aspect, the data in the first protocol can be encapsulated by a second protocol. Alternatively, the data can be altered to conform to the disparate protocol. At 808, the data is transmitted to the remote device.

With reference to FIG. 9, depicted is a methodology 900 for altering and/or routing data from a legacy application to a remote device in an industrial automation environment. At 902, a system can be configured for desired proxy behavior. For instance, configuration can be effectuated a first time that a device is utilized with a legacy application for communication with a particular remote device, while the configuration can be omitted in connection with subsequent communications. At 904, data with a corresponding protocol related to a legacy application is received. The data can be received by intercepting an output yielded with a legacy application. At 906, the data that is received is converted from the protocol associated with the legacy application into a protocol that is suitable for connectivity via the internet to a remote device. According to an aspect, a suitable protocol can provide for encrypting the data while it is transferred over the internet. Modifying the protocol enables the data from the legacy application, which was originally incompatible with web based communications and/or traversing through firewalls, to be utilized at remote locations. At 908, a determination is made as to whether the legacy application is directing data to a non-routable port or an internal, non-routed private IP address. For example, it can be determined whether the legacy application is attempting to communicate with port 44818. Additionally, an IP address in the following ranges can be identified: 10.0.0.0 to 10.255.255.255, 172.16.0.0 to 17.31.255.255, and 192.168.0.0 to 192.168.255.255. At 910, the port and/or IP address to which the legacy application directed data is modified. By way of illustration, a lookup table can be utilized to identify a remote IP address and/or port that correspond to a local IP address and/or port. At 912, the data is transmitted to the remote device at the identified IP address and/or port in a suitable protocol that supports communication via the internet and/or through a firewall.

Turning to FIG. 10, illustrated is a methodology 1000 that enables secure communication over an internet connection and/or through a firewall between a legacy application and a remote device in an industrial automation environment. At 1002, data in a protocol associated with a legacy application is received. At 1004, the received data is converted to a disparate protocol that supports connectivity via the internet to a remote device. It is to be appreciated that any protocol that enables tunneling over the internet can be employed. At 1006, the converted data is transmitted to the remote device. Any suitable connection to the internet can be utilized to transmit the data. The data is received by the remote device at 1008 utilizing any appropriate internet connection. At 1010, the data that was transmitted is unsecured. For example, the data can be decrypted if encryption was utilized during the protocol conversion. Additionally or alternatively, the remote device can convert the protocol from the internet communication compliant protocol back to the protocol associated with the legacy application. According to another example, the received data can be obtained by removing an encapsulation in which the data was located during transfer. At 1012, the data is applied. For example, the data can relate to initiating the opening of a valve. Accordingly, the data can be used by the remote device to effectuate such a command. The subject innovation, however, is not limited to this example.

Figure 11:
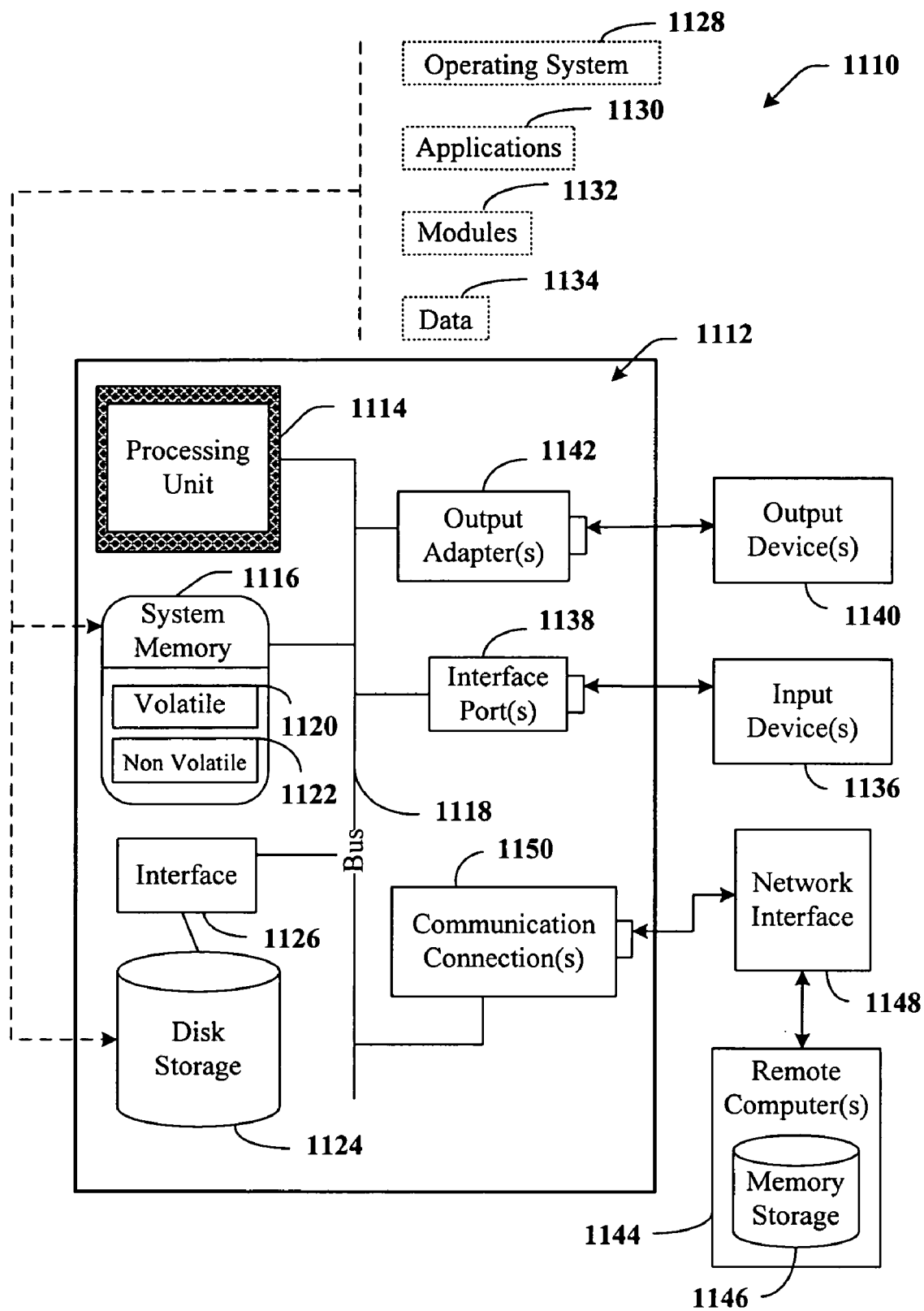
FIG. 11 is an example operating system upon which various features described herein can be implemented.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multi-processor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
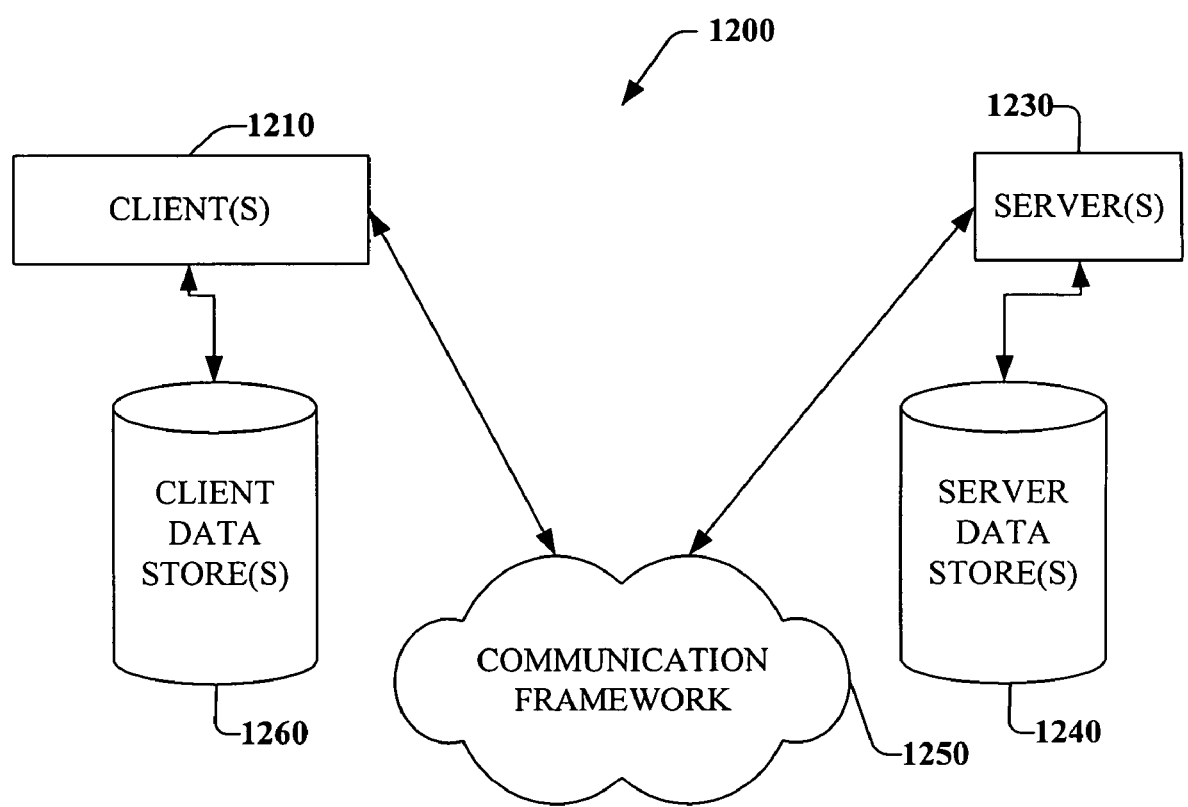
FIG. 12 is an exemplary computing environment within which various features described herein can interact.

FIG. 12 is a schematic block diagram of a sample-computing environment 1200 with which the subject invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject invention, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the invention. It is, of course, not possible to describe every conceivable combination of components or methodologies for purposes of describing the subject invention, but one of ordinary skill in the may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    an industrial controller configured to generate control data to facilitate control of industrial automation equipment, comprising:
        an interface component configured to receive the control data wherein the control data is is associated with a legacy encapsulating protocol for data communication on a local network, the control data is employed by the industrial controller to control a first industrial automation equipment located on the local network and the legacy encapsulating protocol is employed to communicate the control data to the first industrial automation equipment on the local network; and
        a protocol transformation component configured to replace the encapsulating legacy protocol with a disparate encapsulating protocol required for data communication over a remote network to facilitate control, by the industrial controller, of a second industrial automation equipment located on the remote network with the control data utilized to control the first industrial automation equipment.

2. The system of claim 1, wherein the industrial controller is one of a programmable logic controller, a numeric controller, or a robotic controller.

3. The system of claim 1, wherein the interface component is further configured to transmit the control data with the disparate protocol to the remote device located on the remote network via a local area network.

4. The system of claim 1, wherein the interface component is further configured to intercept an output associated with the legacy software.

5. The system of claim 1, wherein the legacy protocol is incompatible with transmission over an internet connection.

6. The system of claim 1, wherein the legacy protocol is incompatible with tunneling through a firewall.

7. The system of claim 1, wherein the legacy protocol is Common Industrial Protocol.

8. The system of claim 1, wherein the disparate protocol is compatible with at least one of transmission over an internet connection and tunneling through a firewall.

9. The system of claim 1, wherein the disparate protocol is at least one of a Transmission Control Protocol/Internet Protocol, a User Datagram Protocol, a HyperText Transfer Protocol, a HyperText Transfer Protocol Secure, an Internet Protocol, an Elliptic Curve Cryptography protocol, a Rivest, Shamir and Adleman encryption protocol, an Advanced Encryption Standard protocol, a Simple Object Access Protocol, or a web services protocol.

10. The system of claim 1, wherein the industrial controller further comprises a routing component configured to redirect the control data to the second industrial automation equipment over an internet connection.

11. The system of claim 10, wherein the routing component is further configured to redirect the control data, which was originally directed to a non-routable port employed by the legacy software for communication on the local network, to a disparate port that supports web based communications over the remote network.

12. The system of claim 10, wherein the routing component is further configured to redirect the control data, which was originally direct to a non-routed private address employed by the legacy software for communication on the local network, to a remote IP address associated with the second industrial automation equipment.

13. The system of claim 12, wherein the routing component is further configured to utilize a lookup table to identify the remote IP address based on the non-routed private address.

14. The system of claim 10, wherein the routing component is further configured to utilize a one to one relationship between the industrial controller employing the legacy software and an internet protocol address associated with the second industrial automation equipment.

15. The system of claim 1, wherein the industrial controller further comprises an encryption component configured to encrypt the control data for transmission with the legacy protocol or the disparate protocol.

16. The system of claim 15, wherein the encryption component is further configured to utilize at least one of private key encryption, public key encryption, symmetric key encryption, an Elliptic Curve Cryptography protocol, a Data Encryption Standard protocol, Secure Hash Algorithm-1, a Rivest, Shamir and Adleman encryption protocol, or an Advanced Encryption Standard protocol.

17. The system of claim 1, wherein the industrial controller further comprises a security component configured to administer security to prevent unauthorized access of the control data.

18. The system of claim 1, wherein the industrial controller further comprises a filtering component configured to selectively filter the control data based at least in part upon at least one of user identity, user location, or remote device location.

19. A system that enables legacy software to connect to remote devices in an industrial automation environment, comprising:
    an industrial automation device configured to control industrial automation equipment, comprising:
        an interface component configured to utilize legacy software that provides data with a legacy encapsulating protocol, wherein the legacy encapsulating protocol facilitates communication on a local network connection and the industrial automation device controls, with the data, a first industrial automation equipment communicatively coupled on the local network connection; and a proxy server configured to intercept the data and replace the legacy encapsulating protocol with a disparate encapsulating protocol that complies with communication protocol required for communication over an internet connection facilitating control of a remotely located second industrial automation equipment with the data utilized to control the first industrial automation equipment.

20. The system of claim 19, wherein the proxy server is a software layer.

21. The system of claim 19, wherein the proxy server is a network based application configured to execute on a network infrastructure component.

22. The system of claim 19, wherein the second industrial automation equipment is configured to connect directly to the internet connection and further configured to perform actions in accordance with instructions comprising the data with the disparate encapsulating protocol.

23. The system of claim 22, wherein the second industrial automation equipment is configured to facilitate at least one of decrypting an encryption layer around the data and utilizing the data in the disparate protocol.

24. The system of claim 19, wherein the second industrial automation equipment is located behind a firewall.

25. A method for utilizing a legacy application with devices located locally and remotely in an industrial automation environment, comprising:
  generating, at an industrial controller, control data comprising instructions to control industrial automation equipment, wherein the control data being generated with an original encapsulating protocol associated with a legacy application, the legacy application facilitating control, with the control data, of first industrial automation equipment located on a local network and the original encapsulating protocol facilitates transmission of the control data on the local network, the original encapsulating protocol does not support connectivity via internet communications;
  replacing, at the industrial controller, the original encapsulating protocol with a disparate encapsulating protocol that supports connectivity via internet communications to a second industrial automation equipment device, wherein the second industrial automation equipment is remotely located and is to be controlled by the legacy application control data; and
  transmitting, by the industrial controller, the control data, with the disparate encapsulating protocol, to the second industrial automation equipment facilitating control, with the instructions comprising the control data, of the second industrial automation equipment by the legacy application.

26. The method of claim 25, further comprising:
  determining whether the legacy application is directing the control data to a non-routable port employed for communicating on the local network; and
  routing the control data to a disparate port for connectivity of the internet communications in response to the legacy application directing the control data to the non-routable port.

27. The method of claim 25, further comprising:
  determining whether the legacy application is directing the control data to a non-routed private internet protocol (IP) address employed by the legacy application for communicating on the local network; and
  routing the control data to a remote IP address associated with the second industrial automation equipment in response to the legacy application directing the data to the non-routed private IP address.

28. The method of claim 25, further comprising:
  receiving the control data at the second industrial automation equipment; and
  unsecuring the control data at the second industrial automation equipment.

29. The method of claim 28, wherein unsecuring the control data includes at least one of decrypting the control data received at the second industrial automation equipment or removing the control data from an encapsulation.

30. The method of claim 25, wherein replacing the original encapsulating protocol with the disparate encapsulating protocol includes replacing with at least one of a Transmission Control Protocol/Internet Protocol, a User Datagram Protocol, a HyperText Transfer Protocol, a HyperText Transfer Protocol Secure, an Internet Protocol, an Elliptic Curve Cryptography, a Rivest, Shamir and Adleman encryption protocol, an Advanced Encryption Standard protocol, a Simple Object Access Protocol, or a web services protocol.

31. The method of claim 25, wherein the original protocol is Common Industrial Protocol.

32. The method of claim 25, further comprising configuring a system for proxy behavior including logging into the system and providing information via a secure mechanism.

33. The method of claim 25, further comprising configuring the second industrial automation equipment by including configuration information with a payload of the control data, wherein the configuration information indicating how the second industrial automation equipment is to communicate with the industrial controller.

34. A proxy server in an industrial automation environment, comprising:
  an industrial controller comprising the proxy server wherein the industrial controller is configured to generate control data to facilitate control of industrial automation equipment, the industrial controller further comprising:
  a processor;
  a computer-readable non-transitory storage medium operationally coupled to the processor and storing computer executable instructions, the computer executable instructions, in response to execution by the processor, implement operations, comprising:
  receiving control data generated by the industrial controller and formatted according to a legacy encapsulating protocol facilitating data communications on a local network, wherein the legacy encapsulating protocol facilitating communicating with a first industrial automation device located on the local network and controlling the first industrial automation device with the control data encapsulated with the legacy encapsulating protocol; and
  replacing the legacy encapsulating protocol with a disparate encapsulating protocol being required for communication of the control data over a remote network facilitating communication between the industrial controller and a second industrial automation device located on the remote network facilitating control of the second industrial automation device with the control data utilized to control the first industrial automation device.

* * * * *